United States Patent
Happel

[15] 3,658,047
[45] Apr. 25, 1972

[54] FOOD WARMING OVEN WITH REMOVABLE TRAY RACKS

[72] Inventor: Hermann E. Happel, Indianapolis, Ind.
[73] Assignee: Norris Food Service, Inc., Indianapolis, Ind.
[22] Filed: Nov. 5, 1970
[21] Appl. No.: 87,191

[52] U.S. Cl. ..................................126/21 A, 126/337 R
[51] Int. Cl. ...........................F24c 15/16, F24c 15/32
[58] Field of Search..............126/19 R, 21 R, 21 A, 337 R, 126/339

[56] References Cited

UNITED STATES PATENTS

| | | | |
|---|---|---|---|
| 2,816,669 | 12/1957 | Schild | 126/337 R X |
| 3,439,665 | 4/1969 | Stromqvist | 126/21 A |

FOREIGN PATENTS OR APPLICATIONS 1,198,612  6/1959  France.................................126/21 A

*Primary Examiner*—Charles J. Myhre
*Attorney*—Woodard, Weikart, Emhardt & Naughton

[57] ABSTRACT

A food warming oven having removable tray racks for receiving different sized and configured trays. A gas-fired, forced-air oven has a pair of inner parallel walls spaced apart from the outer oven walls thereby forming vertical air passages. The inner walls are louvered to allow the air flowing through the passages to pass through the inner walls and across trays positioned atop the tray racks removably mounted to the mutually facing sides of the inner walls. Each tray rack has a pair of flanges with ends inserted through slots in the inner wall. Three parallel rods are fixedly secured to the flanges and are arranged in stepped configuration. A vent is provided with a controllable butterfly valve to allow a portion of the warm air to escape from the oven.

5 Claims, 3 Drawing Figures

INVENTOR.
HERMANN E. HAPPEL
BY
Woodard, Weikart, Emhardt & Naughton
ATTORNEYS

INVENTOR.
HERMANN E. HAPPEL 3,658,047

FOOD WARMING OVEN WITH REMOVABLE TRAY RACKS

BACKGROUND OF THE INVENTION

1. Field of the Invention

This invention is in the field of ovens for warming food.

2. Description of the Prior Art

It is the current practice in many restaurants and food dispensing outlets to precook the food and to then keep the food in a warm and edible condition until purchased. The following U. S. Patents disclose ovens which could be utilized for this purpose: U.S. Pat. No. 2,574,950 issued to Ban-Ami Ben-Dor; U.S. Pat. No. 2,791,199 issued to Hamnett; U.S. Pat. No. 3,288,129 issued to Fox; and, U.S. Pat. No. 3,478,193 issued to Molitor.

Many of the prior art ovens will not keep the food in a sufficiently moist condition so as to retain the freshness of the food. In addition, the prior art ovens have trays for receiving the food which are designed to accommodate only a specific size or shape of tray. The present invention provides an oven which keeps the food in a warm and edible condition through the use of moist and warm forced air. The oven disclosed herein has removable tray racks which will accommodate a variety of different sized and shaped trays.

SUMMARY OF THE INVENTION

The present invention is a food warming oven with removable tray racks. An outer housing having doors encloses first and second parallel and louvered walls. The first and second walls are spaced apart to receive the removable racks being spaced from the outer housing forming first and second vertical air passages. Forced warm air is circulated up through one of the passages, through one of the louvered walls, across the trays and then through the second louvered wall. The racks are aligned each having three parallel rods configured in a stepped configuration. The trays supportingly rest atop the rods. The racks have flanges spaced apart being secured to the rods with ends insertable and mountable to the first and second walls. An air vent communicating with one of the passages is operable to allow a portion of the warm air to exit the oven.

It is an object of the present invention to provide a food warming oven having removable tray racks which will receive a variety of different sized and shaped trays.

In conjunction with the above object, it is an object of the present invention to provide an oven for warming food and for reconstituting frozen food products with moist heated and forced air.

Yet another object of the present invention is to provide an improved oven which is relatively simple in construction and inexpensive.

Related objects and advantages of the present invention will be apparent from the following description.

DESCRIPTION OF THE PREFERRED EMBODIMENT

Figure 1:
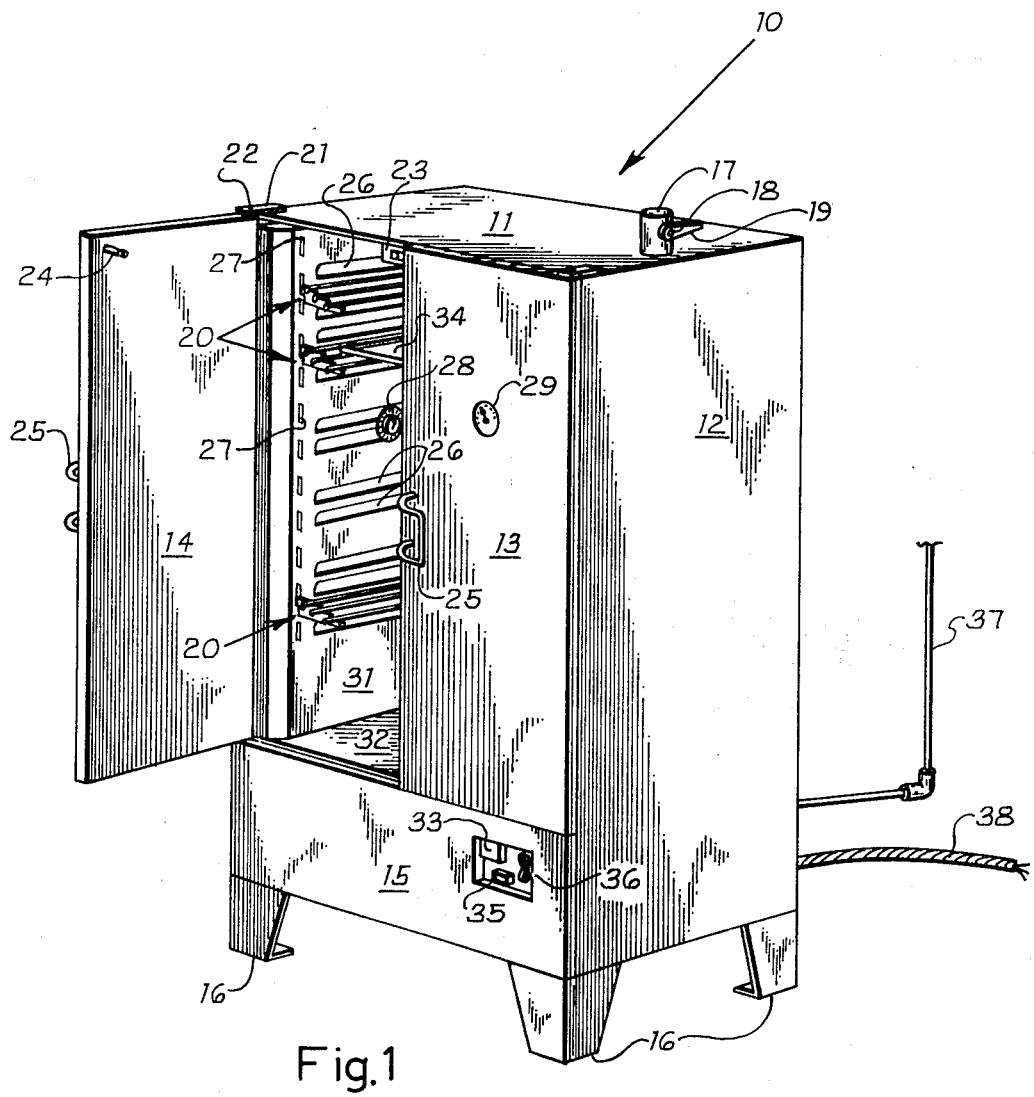
FIG. 1 is a perspective view of an oven incorporating the present invention with one of the oven doors in the open position.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an oven 10 for warming food. Doors 13 and 14 are hingedly mounted to the oven and may be swung open by pulling handles 25 thereby allowing access to the inside of the oven. When closed, doors 13 and 14 seal the oven preventing escape of heat. The doors 13 and 14 are mounted by conventional hinges to the oven assembly. For example, door 14 is hingedly mounted to top wall 11 by bracket 21 fixedly secured to wall 11. A pivot pin extends through end 22 of bracket 21 being received by door 14. A similar arrangement (not shown) pivotally mounts the bottom of door 14 to the oven assembly. Oven assembly 10 has two side walls and a back wall sealingly joined together. Notched rod 24 is mounted to the top inside surface of door 14 and is lockingly received by latch 23 mounted to the inside surface of wall 11. A similar rod and latch secure door 13.

Figure 3:
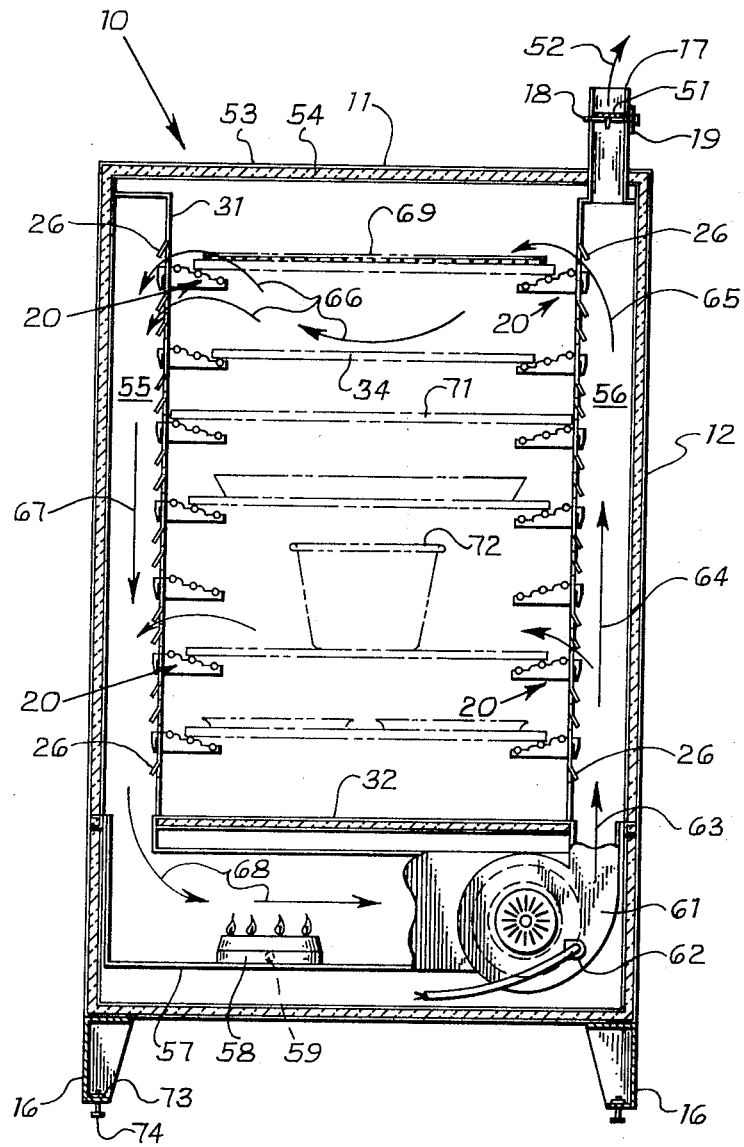
FIG. 3 is a sectional front view of the oven of FIG. 1.

FIG. 3 is a sectional front view of the oven shown in FIG. 1. Referring now to FIGS. 1 and 3, feet 16 are fixedly secured to the bottom of the oven at each one of the four bottom corners. Each leg 16 has a levelling screw 74 which is threadedly received by leg 16 and locknut 73. The oven assembly may be levelled by adjusting one or more of the levelling screws 74. A gas burner 58 is mounted atop bracket 57 secured to the side walls and back wall of the oven. Burner 58 is connected by pipe 59 through the back of the oven assembly to gas line 37 (FIG. 1) connected to a source of gas. A conventional pilot light (not shown) is provided for lighting the gas. Air is drawn across burner 58 in the direction of arrow 68 by a blower 61. A variety of different types of blowers may be utilized to force air across burner 58. Excellent results have been obtained by using a centrifugal air fan. Blower 61 is connected to a source of electrical energy by cable 62 and conduit 38. Blower 61 forces the air to circulate in a counterclockwise direction as viewed in FIG. 3 flowing up through passage 56, then flowing horizontally across the trays and down through passage 55 in the direction of arrow 67. Thus, the air again flows across burner 58 and is warmed the required amount.

Air passages 55 and 56 are formed by ducts fixedly attached to the side walls of the oven assembly. For example, duct 31 fixedly attached to the oven side wall extends down having a bottom end fixedly fastened to wall 32. A duct similar to duct 31 is attached to side wall 12 having a bottom end also fixedly secured to wall 32. Each duct has louvers 26 for allowing the forced warm air to pass therethrough. Thus, the forced air drawn across burner 58 in the direction of arrow 68 passes up through air passage 56 in the direction of arrows 63, 64 and 65. The air then passes through the duct wall via louvers 26 and flows across the trays in the direction of arrows 66. The forced air passes through duct 31 via louvers 26 thereby entering air passage 55 and flowing downward in the direction of arrow 67. To reduce heat loss through the outer walls of the oven, insulation is provided within the walls. For example, top wall 11 has insulation 54 secured between the inner skin and outer skin of the wall. The outer skin 53 as well as the inner skin are metal.

Vent tube 17 is mounted to top wall 11 and communicates with air passage 56. A butterfly valve 51 is pivotally mounted to the vent tube by pin 18 and has a manual operating lever 19. The valve 51 may be opened allowing air from passage 56 to flow outward in the direction of arrow 52. A conventional overhead range hood may be positioned over oven assembly 10 and vent tube 17 to collect the air flowing through the vent tube. It has been determined that a gas heated oven such as the one disclosed provides moisture automatically in the heated air. Of course, the moisture will build up to an undesirable level in the event that the oven is not occasionally vented to the atmosphere. Thus, vent 17 is provided to allow the escape of moisture. A temperature indicator 29 is mounted to door 13 (FIG. 1) communicating with the interior of the oven. Gage 29 may be used to manually check the inside temperature of the oven. In addition, a thermostat 28 mounted to duct 31 is connected by conventional controls to the gas burner. Other controls include an on-off switch 36 for controlling the operation of blower 61 and an on-off pilot switch 35 for operating the pilot light (not shown) for the gas burner. A fuse box 33 is provided to prevent overloading of the electrical circuit by blower 61. An access panel 15 is removably mounted to the side walls of the oven assembly for maintenance of gas burner 58, blower 61 and the other associated devices.

Figure 2:
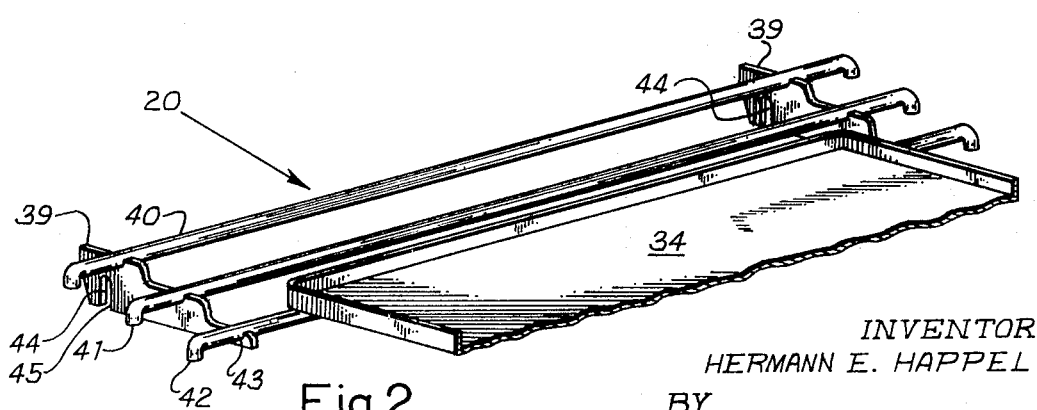
FIG. 2 is a perspective enlarged view of one of the tray racks 20 of FIG. 1 shown unattached to the oven. A fragmentary perspective view of a tray 34 is shown resting atop the tray rack.

FIG. 2 is an enlarged perspective view of one of the tray racks 20 shown in FIG. 1. Each rack 20 has three parallel rods positioned on top of a pair of flanges spaced apart and fixed to the inner side wall of the oven. For example, rods 40, 41 and 42 are secured to flanges 39. The flanges have recesses for receiving the rods. For example, recess 43 is provided in the end of flanges 39 for receiving rod 42. The rods may be secured to the flanges by welding or other suitable means. Slots 27 (FIG. 1) are provided in duct wall 31 at the opposite ends of louvers 26 for receiving flanges 39. Slots 27 have widths slightly greater than the thickness of flange 39. Thus, a flange 39 may be inserted into a slot 27 until wall 31 enters slot 44. The front portion 45 of slot 44 will abuttingly rest against wall 31 thereby supporting flange 39. Similar slots are provided at the rear of wall 31 for receiving the second flange 39. The slots for receiving flanges 39 are aligned and parallel. Rods 40, 41 and 42 are positioned at different elevations for receiving a variety of different sized and shaped trays 34. As shown in FIG. 3, tray racks 20 are positioned on both sides of the oven each having rods for supportingly receiving a tray. The top tray 69 is supported by the middle rods of tray racks 20, while the second tray 34 is supported by the innermost rods of the tray racks. The third tray 71 is the longest tray and therefore is supported by the outermost rods.

The tray racks are designed to be quickly installed or removed. Thus, the tray racks may be positioned to fit the individual use and need of the operator. The trays are also easily removed since they merely rest on top of a pair of rods. Thus, in the event that a tall container 72 (FIG. 3) is to be positioned atop a tray, the user may quickly and easily remove the uppermost tray which would interfere with container 72. It can be appreciated that the rods receiving the tray are positioned and aligned to receive a variety of different sized and shaped trays. For example, circular shaped trays as well as rectangular shaped trays are equally restable atop the rods.

It will be obvious from the above description that the present invention provides a food warming oven having removable tray racks which will receive a variety of different sized and shaped trays. The oven may be used not only for warming food products but also for reconstituting frozen food products by circulating the moist heated air through the air passages and across the trays. It will be further obvious from the above description that the present invention provides an improved form of oven which is relatively simple in construction and inexpensive.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A food warming oven comprising:
   an outer oven housing having a door;
   a first wall and a second wall being louvered, parallel and spaced apart, said first and second wall positioned within said housing forming a vertical air passage between said housing and said first wall and another vertical air passage between said housing and said second wall;
   tray mounting racks removably mounted to said first wall and said second wall, said racks mounted to said first wall being aligned in elevation with said racks mounted to said second wall, each of said racks having outer tray receivers and inner tray receivers; and,
   removable trays positioned between said first wall and said second wall, said trays being restable atop said outer tray receivers and said inner tray receivers.

2. The oven of claim 1 wherein:
   all of said receivers are rods, each of said racks have an outer receiver positioned above an inner receiver, said racks have a pair of flanges secured to said outer receiver and said inner receiver with ends insertable through and mountable to said first wall and said second wall.

3. The oven of claim 2 additionally comprising:
   intermediate rods mounted atop said flanges being parallel with and positioned between said inner tray receivers and said outer tray receivers; and wherein,
   said trays are restable atop said intermediate rods.

4. The oven of claim 3 wherein:
   said first wall and said second wall have slots receiving said flanges; and,
   said trays are of different sizes and configurations.

5. The oven of claim 4 wherein:
   said oven has an air heater and a fan operable to circulate warm air up one of said passages, through said first wall, across said trays, through said second wall and down through the other of said passages; and,
   said oven has an air vent communicating with one of said passages and is operable to allow a portion of said warm air to exit said oven.

* * * * *